United States Patent [19]

Englund

[11] 4,051,349
[45] Sept. 27, 1977

[54] RECORDING UNIT

[75] Inventor: Sven Englund, Ektorp, Sweden

[73] Assignee: Hugin Kassaregister AB, Stockholm, Sweden

[21] Appl. No.: 668,186

[22] Filed: Mar. 18, 1976

[51] Int. Cl.² .............................................. G06C 25/00
[52] U.S. Cl. ............................. 235/130 R; 200/42 R; 200/44; 361/171
[58] Field of Search ............. 235/130 R; 70/271, 237; 200/42 R, 44, 45; 307/10 AT; 317/134, 135 A

[56] References Cited

U.S. PATENT DOCUMENTS

| 2,868,905 | 1/1959 | Meyer | 200/42 R |
|---|---|---|---|
| 3,631,301 | 12/1971 | Goldman | 317/134 |
| 3,663,774 | 5/1972 | Feder | 200/42 R |
| 3,806,675 | 4/1974 | Krom et al. | 200/44 |
| 3,873,891 | 3/1975 | Gerber | 317/134 |
| 3,959,613 | 5/1976 | Gerber | 200/144 |

Primary Examiner—Robert K. Schaefer
Assistant Examiner—Vit W. Miska
Attorney, Agent, or Firm—Darby & Darby

[57] ABSTRACT

A cylinder lock wherein the insertion and rotation of a selected one of associated keys results in a projection of certain pins, mounted in a row parallel to the axis of the cylinder, radially beyond the cylinder surface in response to the irregularities of the key. The displaced pins effect a closing of contacts in a pattern to produce selected circuit functions. According to the invention the pins, when activated, deflect overlying respective parallel flexible wires extending transversely of the pin row. The deflected wires urge, via an insulated member, overlying movable contact reeds to engage overlying fixed contact members, so that circuits are closed as determined by the irregularities of the key.

7 Claims, 2 Drawing Figures

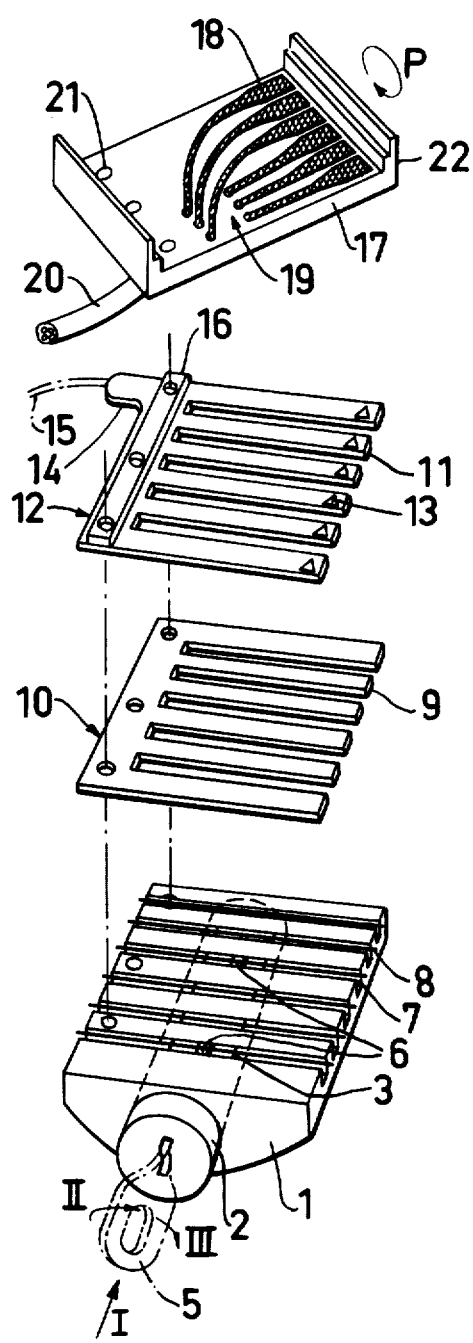
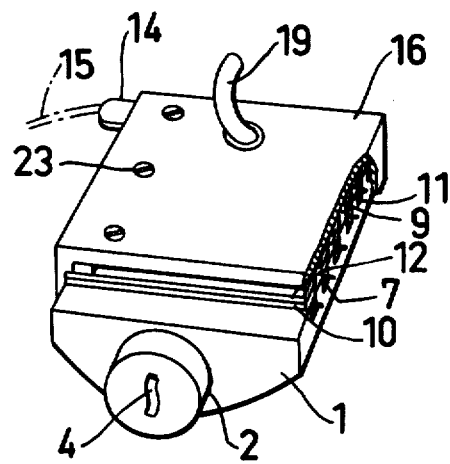

RECORDING UNIT

The present invention refers to a coded switch which may be used with a recording unit, such as a cash register. The switch comprises a key-operated cylinder in a bored block, in which cylinder a longitudinal row of pins are mounted for slidable motion radially of the cylinder and adapted to be selectively projected beyond the same, when actuated by the irregularities of a key inserted in the lock and turned, to act upon corresponding ones in a set of spring members for urging respective contact reeds against corresponding ones in a set of fixed contact members thereby establishing a coded contact pattern for producing a desired electric circuit function in the recording unit.

The invention allows the irregularities of a key bit to act upon means for making or breaking circuits to obtain predetermined electric functions.

As a practical example a cash register may be considered which is provided with a multi-cell memory, the number of cells corresponding to the number of cash operators expected to service the register (shift assignment system). Each operator has his own special key and is assigned corresponding memory cells where the amount cashed by the operator is to be accumulated. Then the key enables access to these memory cells. A checker equipped with a set of keys will then be in a position to easily read out from respective memory cells, e.g. at the end of the working day, each operator's sales at the cash register.

Other applications of the different electric circuits selectively triggered by different keys are obvious to a person skilled in the art.

The invention presents an especially practical, reliable, economical and compact — and, above all, lasting - version of said arrangement by the improvement that each of said spring members consists of a section of a flexible and smooth wire, longitudinally guided over each of said pins and extending substantially along and below the centre line of each contact reed, and spaced therefrom by an insulation.

The invention is described in more detail below while referring to the accompanying drawings.

FIG. 1 shows an exploded perspective view of the arrangement according to the invention, and FIG. 2 shows this arrangement after assembling with a part broken away to enable identification of the various parts.

A block 1 contains a cylinder 2 which is rotatably mounted in a corresponding bore in the block, and is, as with the conventional cylinder lock types, provided with a keyhole 4 (FIG. 2) for a key 5 indicated by dash-and-dot lines. In the transverse direction of the cylinder grooves 7 extend in the flat upper surface of the block 1. The bottom of each groove is intersected at 3 by the upper part of said bore to pass a plurality (only two shown) of pins 6. In the example shown there are six grooves and, thus, the use of six pins are possible.

In each groove 7 a section 8 of a wire of an elastic material, as so-called music or piano wire, is positioned with slidably clamped (in a manner described later) ends so that it can be deflected upwards by its associated pin 6. The figure shows, in an examplary way, the first and the fourth wire in the set of six wires 8 bent to bow shape by the two pins shown.

On the flat upper surface of the block 1 a generally comb-shaped thin sheet 10 of an insulating and flexible material, having six fingers or tongues 9, is fixed at its base portion in a manner to bring the tongues 9 cover the underlying grooves 7.

Similarly, a comb-like structure of a thin metal plate 12, preferably of phosphor bronze, slotted to form six reeds 11, has its base portion fixed to the block over the insulating sheet 10 to cover the insulating tongues 9 with its conductive reeds 11. At their free ends the plate reeds 11 support contact points 13. From the base portion of the plate 12 a terminal ear 14 extends for connection to a voltage supply through a conductor 15 indicated by dash-and-dot lines. Further, an insulating bar 16, also serving as a spacing member, is fixed to the base portion of the plate 12.

The continuity of the exploded view in FIG. 1 is broken, for the sake of understanding, by the uppermost subfigure; the detail shown there is to be turned over when assembled, as is also indicated by the arrow P. A plate 17 of insulating material supports on its underside (upper side in the figure) a simple printed circuit having six foil strips 18 with associated extensions to respective six terminals generally indicated by 19, which are connected to a six wire cable 20 on the opposite side of the plate 17. Mounting holes 21 are provided in one marginal portion of the plate 17 are, upon assembling, aligned with the holes of the underlying details, as indicated by the dash-and-dot lines through the respective holes.

Moreover, the plate 17 is formed with two opposite stepped flanges 22, serving to, upon assembling by means of screws 23 (FIG. 2) clamp the ends of the wires 8 against the groove mouths with the higher step, and to prevent the wire sections from sliding off the grooves with the lower step.

The operation is as follows:

The key 5 is pushed in (position I) so that its irregularities push the corresponding pins 6 out from the cylinder at an angle to and stopping short of the respective grooves, whereafter the key is turned to position II (that shown) so that the pins enter the grooves. This turns on the line voltage (indicated by lamps) and triggers the desired electric function as determined by the toothing of the key. (The line voltage may be switched on by an element on the rotating cylinder 2 actuating a microswitch.) More particularly, the actuated pins 6 passing through the corresponding groove bottoms push the overlying wires 8 and insulating tongues 9 against the corresponding plate reeds 11 bringing their raised contact points 13 to engage the overlying foil strips 18 on the printed circuit board 17. This results in a circuit being closed from the live terminal ear 14 of the plate 12 to the corresponding ones of the six output terminals 19. The produced code signal (in the example over 60 combinations are possible) is, via the cable 20, applied to the electronics of the recording unit for selectively triggering a circuit function which, thus, is uniquely determined by the toothing of the inserted key.

To increase the service life of the switch, it is vitally important that a perfect contacting function is maintained. In this respect, the spring arrangement of the invention is of great significance. By the insertion of the smooth spring wires 8 between the likewise smooth tops of the pins 6 and the insulating sheet 10, having a relatively low wear-resistance, firstly, the pins are spared wear and, secondly, the insulation sheet is only subjected to pressure, as the pins during their sliding motion, when the cylinder is rotated, transfers this motion to a successive arching of the wires. This means that the wear factor is reduced optimally which, in its turn, renders a maximum service life or endurance to the construction.

If the recording unit, for example, is a cash register, the electronics of which include an amount memory, the initial turning of the key (to position II) provides access to the memory cells assigned to a certain cash operator, viz. the one who has the particular key corresponding to the cell. Registered cash items will, thus, be inserted and added in that operator's memory cells and made available for inspection.

When the key is turned further to the end position (position III) it can be pulled out, but the voltage is still switched on, i.e. the illuminated indicating lamps are still alight. Thus, one can always see if the information remains in the memory cells, or if it has been removed by turning the key back from position II to I instead of advancing to position III.

A plurality of modifications are possible within the scope of invention. The grooves 7 may be replaced by some other longitudinal guide means for the wires 8, and these wires may be rigidly fixed at one end thereof; at least the second end must be permitted to slide. Principally the wires could be insulated to eliminate the need of the insulating sheet 10; however, the wire insulation would add an extra wear component.

Also other modifications are obvious to a person skilled in the art.

What is claimed is:

1. A key-operated switch comprising:
    a block having a bore therein;
    a key-operated cylinder rotatably mounted in the bore of said block, said cylinder adapted to receive any of a plurality of associated keys,
    a row of pins mounted in a row parallel to the axis of said cylinder and adapted for sliding radial movement within said cylinder, said pins adapted to be displaced and project beyond the surface of said cylinder, said displacements corresponding to the irregularities of a selected key when inserted in said cylinder;
    a set of spring members including parallel sections of flexible wire mounted on said block, each of said wire sections extending across the path of travel of a corresponding one of said pins and in a direction transverse to said pin row;
    a set of contact reeds mounted on said block and adjacent said spring member, each of said reeds aligned with a corresponding one of said pins and being adapted for displacement responsive to displacement of said corresponding spring member;
    insulating means for electrically insulating said spring members from said contact reeds; and
    a set of contact members fixedly mounted on said block and adjacent said contact reeds, each of said contact members being aligned with a corresponding contact reed, and being positioned to contact said corresponding contact reed displaced by said corresponding spring member when a key is inserted in said cylinder.

2. A switch according to claim 1 wherein said block includes a plurality of parallel grooves extending across a flat surface of said block in a direction transverse to said cylinder, the bottoms of each of said grooves including a slot adapted to pass pins of said cylinder displaced by a key, and
    each of said wire sections being a wire substantially coextensive with and positioned in a respective groove, and being slidable within said groove, said groove being adapted to guide said corresponding wire longitudinally while said wire is displaced by said corresponding pin.

3. A switch according to claim 1 wherein said insulating means comprises a comb-shaped sheet of flexible insulating material having its base portion fixedly engaged on said block, said sheet having fingers projecting over and covering said grooves.

4. A switch according to claim 3 said set of contact reeds being comb-shaped and substantially congruent to and substantially aligned with said insulating means.

5. A switch according to claim 4 further comprising a plate fixedly mounted on said block adjacent said set of contact reeds,
    said contact members being mounted on a surface of said plate facing said contact reeds,
    said contact reeds including electrically conductive contact points disposed at the free ends thereof,
    said contact members having electrically conductive strips, a portion of each strip being aligned with a corresponding contact point.

6. A switch according to claim 1, wherein said switch includes a first operating position corresponding to the insertion of a selected key for unlocking a recording unit associated with said switch, a second operating position with said inserted key partially turned in said cylinder and corresponding to the functional position of said recording unit, and a third operating position wherein said key may be withdrawn while allowing said recording unit to remain functional.

7. A switch according to claim 6, wherein said switch is adapted to actuate a mirco-switch for connecting said recording unit to a power source when said switch enters said second position.

* * * * *